United States Patent [19]
Diehl et al.

[11] Patent Number: 4,717,224
[45] Date of Patent: Jan. 5, 1988

[54] LASER SCANNING DEVICE FOR FASTEST POSSIBLE DEFLECTION OR SWEEP VELOCITIES

[75] Inventors: Christian Diehl; Horst Kirsche, both of Munich, Fed. Rep. of Germany

[73] Assignee: Messerschmitt-Boelkow-Blohm Gesellschaft mit beschraenkter Haftung, Munich, Fed. Rep. of Germany

[21] Appl. No.: 923,003

[22] Filed: Oct. 24, 1986

[30] Foreign Application Priority Data

Oct. 24, 1985 [DE] Fed. Rep. of Germany ....... 3537843

[51] Int. Cl.$^4$ .............................................. G02B 26/10
[52] U.S. Cl. ......................................... 350/6.9; 350/6.4
[58] Field of Search .............................. 350/6.3–6.91

[56] References Cited

U.S. PATENT DOCUMENTS

| | | | |
|---|---|---|---|
| 1,647,631 | 11/1927 | Ives | 350/6.3 |
| 2,928,952 | 3/1960 | Bednarz | 350/6.4 |
| 2,975,668 | 3/1961 | Eckel | 350/6.4 |
| 3,226,721 | 12/1965 | Gould | 350/6.4 |
| 3,720,454 | 3/1973 | Inderhees | 350/6.4 |

Primary Examiner—Bruce Y. Arnold
Assistant Examiner—Loha Ben
Attorney, Agent, or Firm—W. G. Fasse; D. H. Kane, Jr.

[57] ABSTRACT

A laser scanning device for fastest possible deflection or sweep velocities is constructed for use in a laser guide or pilot beam system. The scanning device has two symmetric scanning cylinders which each are caused to rotate about their respective rotational axis or axis of symmetry by a gas stream so as to achieve a rapid beam deflection. Due to the low structural weight and small dimensions of the scanning cylinders with their respective scanning mirrors passing through the scanning cylinder at a slant, angular velocities up to the breaking limit of the material can be achieved.

6 Claims, 4 Drawing Figures

U.S. Patent     Jan. 5, 1988     4,717,224
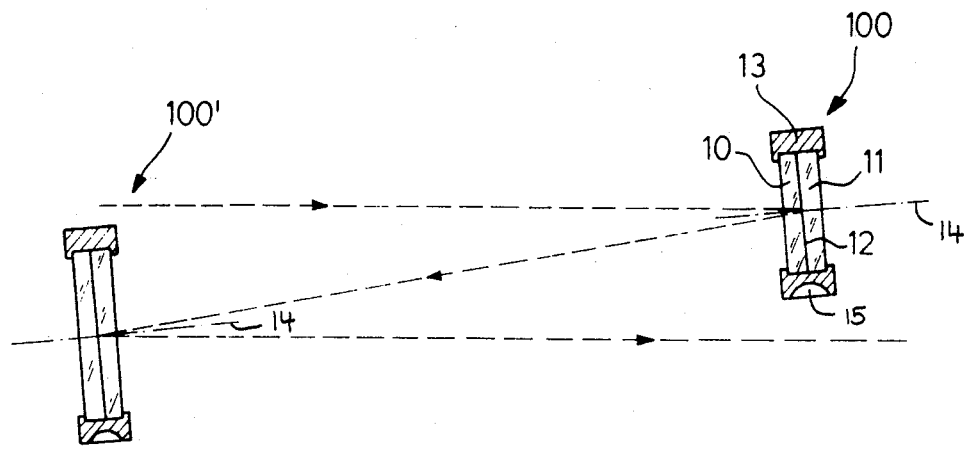
FIG. 1
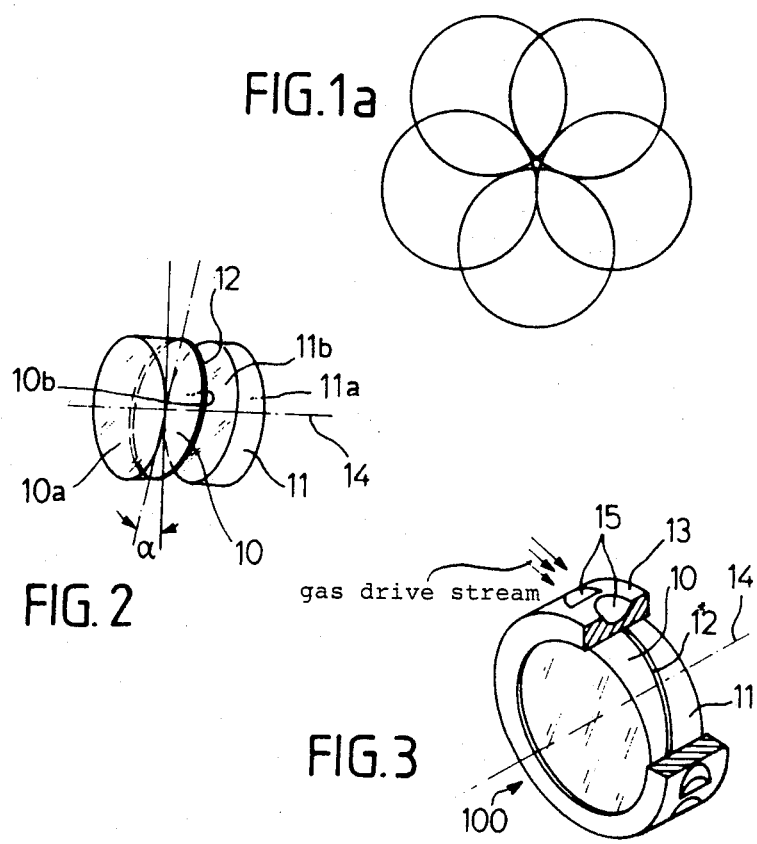
FIG.1a
FIG. 2
FIG. 3

LASER SCANNING DEVICE FOR FASTEST POSSIBLE DEFLECTION OR SWEEP VELOCITIES

FIELD OF THE INVENTION

The invention relates to a fast scanning device for highest possible deflection or sweep velocities in laser guide beam systems.

DESCRIPTION OF THE PRIOR ART

A scanning device of this type is an optical tool for deflecting light beams to create a spacial pattern. The space pattern created by the deflected light beam is repeated at a determined repeat frequency. Such a scanning device is used in laser guide or pilot beam systems for achieving a space-time correlation by means of a time synchronized illumination of various points in space. By achieving such a space-time correlation, addresses may be assigned to the corresponding points in space. Any laser guide beam projector which senses or scans each of these spacial points operates on this basic principle.

In order to achieve an adequate signal redundancy and due to the high velocity and mobility of some weapons systems, the repeat frequency of the space pattern required by such weapons systems is very high. Therefore, acoustic-optical deflectors are used for the scanning devices of such systems. While acoustical-optic deflectors provide a fast repeat frequency, problems arise when two-color deflections are desired, especially when the spectral ranges of the two colors are widely separated from each other or if the deflection is to be achieved at a large deflection angle. To avoid problems in these cases, mirror deflector systems are used. However, in ths connection, mirror systems are extremely slow. In order to avoid atmospheric scintillations and to avoid limiting the high mobility and veocity of the flying body, the desired repeat frequency of the entire scanning pattern is in the range of 10 kHz. This desired frequency of 10 kHz is, however, approximately 3 orders of magnitude faster than the frequencies achieved by ordinary conventional mirror scanning devices.

OBJECTS OF THE INVENTION

In view of the foregoing it is the aim of the invention to achieve the following objects singly or in combination:

to achieve a high rotational speed of the deflecting mirror of up to $10^6$ rotations per minute in a laser scanning device for a laser guide beam system;

to achieve a high repeat frequency of the scanned space pattern signal for providing a high signal redundancy for weapons systems having a high speed and mobility to assure the high speed and maneuverability of the respective flying bodies and for avoiding atmospheric scintillation interference; and to achieve a fast beam deflector or sweep in such a laser scanning device even if several colors or wave lengths of radiation are involved and even at substantial deflection angles.

SUMMARY OF THE INVENTION

The above objects have been achieved in a fast laser scanning device according to the invention, wherein the scanning device essentially comprises a scanning cylinder having two similar transparent cylindrical members which are connected in an axial alignment, for example, by an adhesive bonding. The inner end surface of each cylindrical member is not perpendicular to the axis of the cylinder. Instead, each inner end surface deviates by a small angle $a$, between approximately 0.2° and 2°, from a plane parallel to the outer end surfaces of the cylindrical members which extend perpendicularly to the rotational axis of the cylindrical scanner. A mirror layer is sandwiched between the two adjacent "wedge-shaped" inner end surfaces of the two cylindrical members so as to form one complete cylinder cut through at an angle by the mirror layer. The cylinder is arranged in an air suspended and gas stream driven mounting frame.

The mirror arrangement, or rather the scanning cylinder, with its internal slanted mirror may be driven by a gas or air stream to rotate it at a high rotational speed approaching the rotational breaking point of the material of which the scanning cylinder and its mounting frame is made. Several of these scanning cylinders may be appropriately combined to achieve a rotating mirror system for a scanning device for a laser guide beam system.

BRIEF DESCRIPTION OF THE DRAWINGS

In order that the invention may be clearly understood, it will now be described, by way of example, with reference to the accompanying drawings, wherein:

FIG. 1 is an enlarged schematic side view of the rotating mirror system functioning as a gyro system and including two scanning cylinders;

FIG. 1a is a schematic top view of the lines of motion of the rotating mirror system according to FIG. 1;

FIG. 2 is a partially exploded view of the wedge-shaped cylindrical sections of the rotating scanning cylinder with its slanted mirror; and FIG. 3 is an enlarged perspective view onto a rotating mirror in its mounting frame.

DETAILED DESCRIPTION OF PREFERRED EXAMPLE EMBODIMENTS AND OF THE BEST MODE OF THE INVENTION

As shown in FIGS. 1 to 3, the scanning device of the invention is assembled of specifically constructed cylindrical scanners 100, 100'. Each of the cylindrical scanners 100, 100' comprises two coaxial cylindrical members 10, 11 and a mirror 12 sandwiched between the members 10 and 11 to form the cylindrical scanner which is enclosed by a frame 13. The cylindrical scanners 100, 100' rotate about a main rotation axis 14, whereby the cylindrical members 10, 11 are supported by an air cushion within the frame 13 which is caused to rotate by a gas or an air drive stream shown by three arrows in FIG. 3. The frame 13 has wings or vanes 15 exposed to the driving gas or air stream. Thus, the air stream serves as a suspension or air cushion bearing and as a rotational drive for the frame 13. In order to achieve the appropriate optical effect, the cylindrical members 10, 11 are not mirrored on their outer surface. Instead, a mirror layer 12 bisects the cylindrical scanners 100, 100' at an angle not perpendicular to the axis 14. In other words, each cylindrical scanner 100, 100' comprises two similar transparent cylindrical members or bodies 10 and 11 which are coaxially connected with the mirror layer 12 sandwiched between them and, e.g., adhesively bonded thereto. The mirror 12 is arranged at an angle corresponding to the angle of the inner end surfaces 10b and 11b of the cylindrical members 10 and 11 respectively, that is, at a small angle $a$ away from a plane perpendicular to the axis 14. This small angle α is between approximately 0.2° and 2°, depending on requirements, operating conditions, etc. This angle α of the mirror layer 12 is achieved as shown in FIG. 2, in that the inner end surfaces 10b, 11b which are to receive the mirror layer 12, deviate by the desired angular value α from being parallel with the outer end surfaces 10a, 11a so that the cylindrical members 10, 11 have a wedge-shape. The wedge-shaped cylindrical members 10, 11 are laminated to each other with the mirror layer 12 in between, for example, by gluing, so that the plane mirror 12 passes with a slant through the cylindrical scanner 100, 100', whereby the axis 14 is not bent and does not need to precess during rotation. Thus, the cylindrical scanners 100, 100' comprise two completely alike cylindrical members 10, 11, which are glued together. These two cylindrical members 10, 11 may be mirror surfaced only on one or the other inner inclined end planar surfaces 10b, 11b to form the mirror 12. The dimensions of the cylindrical scanners 100, 100' are relatively small. For example, in the embodiment shown in FIG. 1 the height of the components is between approximately 3 to 10 mm, preferably 5 mm to 7 mm. This "height" is the thickness in the direction of the axis 14. The diameter is in the range of 3 to 30 mm.

As mentioned above, the cylindrical members 10, 11 are arranged in the frame 13 and supported in an air suspension or cushion set into rotation by an air stream passing over the frame 13, whereby the gas stream impinges on the wings 15. Due to the small dimensions and the low weight of the cylindrical scanners 100, 100' these may be accelerated to extraordinarily high angular velocities which approach the material breaking point. In the shown example embodiment a rotational speed of approximately 1,000,000 r.p.m. is possible. In order to best utilize the air or gas stream for achieving an optimal rotational speed, the frame 13 may be provided with wind catching surfaces other than the wings 15, such as wind scoops, wind pits, etc., that is, with means which are knwon in the gyro technology.

During rotation of the laminated cylindrical scanner 100, 100' the mirror surface 12 enclosed in the cylindrical scanner 100 "wobbles". Since the laser beam has not been dispersed, and has a diameter of less than 3 mm, it is sufficient for the cylindrical scanner 100 to have a diameter of 3 mm. As mentioned above, such a small cylinder may be accelerated to rotational velocities of approximately 1,000,000 r.p.m. The wobbling mirror surface 12 which now is only a few atom layers thick, cannot produce any notable unbalance torsional force. Due to the mirror's wobbling, the laser beam is deflected along a circular path.

In order to obtain a scanning pattern, a second cylindrical scanner 100' is used which similarly deflects the laser beam along a circular path. If the two mirror rotation frequencies are now not equal, then a spacial pattern is produced, as for example, shown in FIG. 2. The second scanner 100' may rotate at a considerably slower rotational velocity than the first mirror 100. However, the second mirror 100' must have a larger diameter than the first mirror 100 as shown in FIG. 1 due to the divergence of the incoming laser beam. Instead of a larger diameter for the second mirror 100' a converging lens may be employed.

For the use of the laser scanning device for a steerable grenade or projectile, the spiral shaped scanning pattern shown in the example of FIG. 2, results. The spiral is followed first from inside to the outside and then from the outside to the inside.

Although the invention has been described with reference to specific example embodiments, it will be appreciated, that it is intended to cover all modifications and equivalents within the scope of the appended claims.

What we claim is:

1. A laser scanning device for highest possible deflection or sweep velocities in laser guide beam systems, comprising scanning means including a first transparent cylindrical wedge, a second transparent cylindrical wedge, a mirror surface located between said first and second wedges for forming a scanning mirror and frame means (13) for mounting said scanning mirror, said frame means (13) being arranged coaxially on a rotation axis for rotating about said rotation axis, each of said first and second cylindrical wedges comprising an outer end surface perpendicular to said rotation axis and an inner slanted end surface deviating by an angle α from a perpendicular to said rotation axis, said mirror surface being located between said inner slanted end surfaces of said first and second cylindrical wedges, thereby forming a scanning cylinder through which said mirror surface passes at a slant, and wherein said frame means include means (15) for rotating said scanning cylinder by a driving gas stream.

2. The laser scanning device of claim 1, wherein said angle α lies between 0.2° and 2°.

3. The laser scanning device of claim 1, wherein said means for rotating are adapted to be driven by an air stream to a rotational velocity approaching the breaking limit of material of which said scanning means are made.

4. The laser scanning device of claim 1, wherein said means for rotating said frame means comprise surfaces for catching a driving gas stream.

5. The laser scanning device of claim 1, wherein said scanning means further include a second scanning cylinder combined with said first mentioned scanning cylinder to form a rotating mirror system, whereby one of said two scanning cylinders has a larger diameter and a smaller rotational velocity than the other of said two scanning cylinders.

6. The laser scanning device of claim 1, wherein said scanning cylinders have a thickness and a diameter lying in the size range of about 3 mm to about 10 mm.

* * * * *